J. W. ALBIN.
NUT LOCK.
APPLICATION FILED FEB. 1, 1919.

1,323,806.	Patented Dec. 2, 1919.

Inventor
Jeremiah W. Albin,
By his Attorney
William Richards

UNITED STATES PATENT OFFICE.

JEREMIAH W. ALBIN, OF BABYLON, NEW YORK.

NUT-LOCK.

1,323,806.     Specification of Letters Patent.     Patented Dec. 2, 1919.

Application filed February 1, 1919. Serial No. 274,424.

*To all whom it may concern:*

Be it known that I, JEREMIAH W. ALBIN, a citizen of the United States, residing at Babylon, county of Suffolk, and State of New York, have invented certain new and useful Improvements in Nut-Locks, of which the following is a specification.

This invention relates to nut-locks and it has for its object to provide an improved type of nut-lock which will be characterized by cheapness, efficiency, and ease of application and removal, and which, furthermore does not require any special construction or formation of the bolt.

For further comprehension of the invention and of the objects and advantages thereof, reference will be had to the following description and accompanying drawings, and to the appended claim in which the various novel features of the invention are more particularly set forth.

Figure 1 of the drawings is a side view of a bolt and nut having the invention applied thereto.

Figure 1:
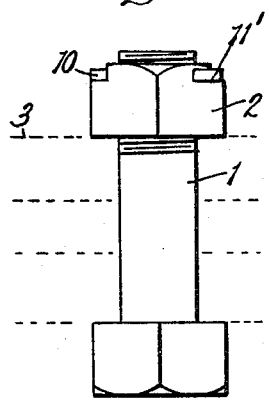
Figure 2:
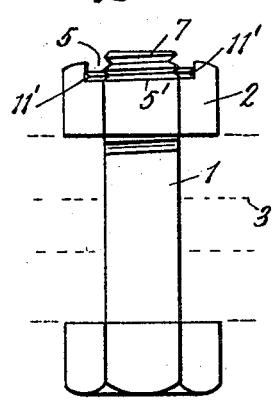
Fig. 2 is an elevation thereof at right angles to Fig. 1.
Figure 3:
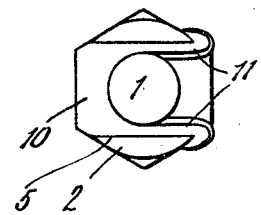
Fig. 3 is a plan view thereof.

In the drawings 1 indicates a headed bolt of ordinary construction and 2 a nut threaded thereon, it being understood that any desired parts, such as a rail end and fish plates, may be secured between the nut and bolt head, as indicated in dotted lines at 3 in Figs. 1 and 2.

The nut 2 may be of usual size and shape, being of ordinary construction except for the shallow groove 5 extending across one of the transverse faces thereof, preferably the outer one, the term transverse faces being here used to designate the faces which extend transversely to the axis of the nut. This groove is somewhat wider than the bolt hold and has vertical side walls 6.

The bottom 5' of this groove, as seen in transverse elevation, is preferably inclined in correspondence to the pitch of the threads 7 on the bolt, and the groove may be, if desired cut with reference to the positioning of the thread to have the bottom of the groove substantially flush with the apex of the thread thus leaving equal spaces above the bottom face of the groove and under the thread at each side of the bolt.

Figure 6:
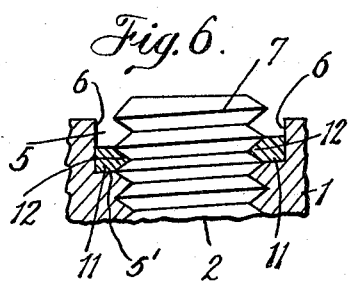
Fig. 6 is an enlarged fragmentary section on the line 6—6 of Fig. 3.

The nut is locked to the bolt by a flat locking member of a width to fit snugly between the walls 6 of the groove, this locking member consisting of a body portion 10 and integral projecting prongs 11 which straddle the bolt and whose outer sides extend flush with the ends of the body portion and whose inner sides are spaced apart a proper distance to engage in the interstices of the threads on the bolt as shown in detail in Fig. 6. These inner sides of the prongs are preferably beveled as shown at 12 to fit the thread grooves.

Figure 4:
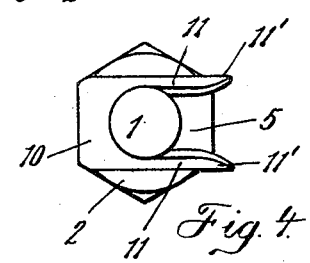
Fig. 4 is a similar view but showing the prongs of the locking member not clenched.
Figure 5:
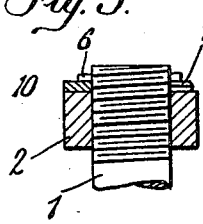
Fig. 5 is a vertical section on the line 5—5 of Fig. 3.

The prongs 11 are of a size to require a driving force to be exerted to wedge them between the nut and bolt and are of sufficient length to project beyond the nut when the locking member is driven home, as shown in Fig. 4. The projecting ends 11' are finally turned back on the nut as shown and the lock is complete.

To remove the nut the ends 11' may be struck off, or bent straight again, and the locking member 10 is driven out.

Figure 10:
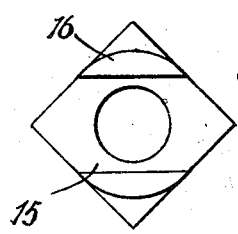
Fig. 10 is a plan view of a square nut showing the direction in which the groove for the locking member is cut therethrough.

As shown in the drawings the groove 5 is preferably cut through the nut along the larger diameter thereof, thus causing the walls of the groove to form an acute angle with the sides of the nut and facilitate clenching of the prongs. In Fig. 10 I have shown a groove 15 cut in this manner in a square nut.

Figure 9:
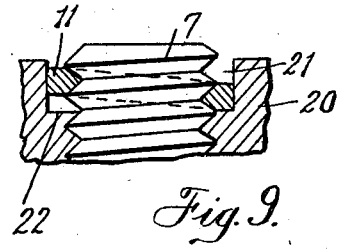
Fig. 9 is a similar view of Fig. 6 showing a slight modification.
Figure 7:
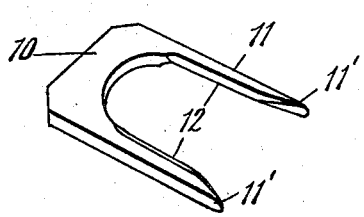
Fig. 7 is a perspective view of the locking member.
Figure 8:
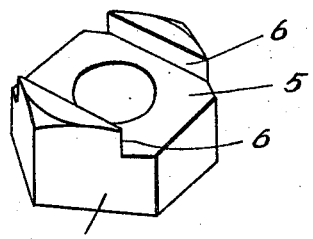
Fig. 8 is a similar view of the nut.

In Fig. 9 I have shown a nut 20 having a groove 21 with a straight, or non-inclined bottom 22 and have shown also how the prongs 11 of the locking member may wedge in alternate interstices of the thread on the bolt.

As will be apparent I have designed a nut-lock having many advantages as set forth over those known to the art and the right is reserved to changes and modifications other than those here indicated which come within the scope and intent of the appended claim.

Having thus described my invention and set forth the manner of its use, what I claim as new and desire to secure by Letters Patent, is:—

The combination with the bolt of a nut having a transverse groove extending through one face thereof with its bottom transversely inclined to correspond with the threads of the bolt, and an integral locking member having two prongs adapted to be received in said groove and to tightly engage the threads of said bolt on two sides thereof, the ends of said prongs extending beyond the periphery of said nut and adapted to be turned back upon the same for locking purposes.

In testimony whereof I have affixed my signature.

JEREMIAH W. ALBIN.